(12) United States Patent
Klesk et al.

(10) Patent No.: US 11,270,035 B2
(45) Date of Patent: Mar. 8, 2022

(54) METHODS TO GENERATE A WIRING SCHEMA

(71) Applicant: Banner Engineering Corp., Minneapolis, MN (US)

(72) Inventors: John Klesk, Minneapolis, MN (US); Danielle Liu, Minneapolis, MN (US); Greg Sorvari, Minneapolis, MN (US); Dean Erickson, Minneapolis, MN (US); Greg Anderson, Minneapolis, MN (US); Jeff Dixon, Minneapolis, MN (US)

(73) Assignee: BANNER ENGINEERING CORP, Minneapolis, MN (US)

( * ) Notice: Subject to any disclaimer, the term of this patent is extended or adjusted under 35 U.S.C. 154(b) by 315 days.

(21) Appl. No.: 16/508,137

(22) Filed: Jul. 10, 2019

(65) Prior Publication Data

US 2021/0011978 A1    Jan. 14, 2021

(51) Int. Cl.
*G06F 30/13* (2020.01)
*G06F 30/333* (2020.01)

(52) U.S. Cl.
CPC ............ *G06F 30/13* (2020.01); *G06F 30/333* (2020.01)

(58) Field of Classification Search
None
See application file for complete search history.

(56) References Cited

U.S. PATENT DOCUMENTS

| 5,182,459 A | 1/1993 | Okano et al. |
|---|---|---|
| 5,726,887 A | 3/1998 | Spies et al. |
| 6,920,407 B2 | 7/2005 | Adamian et al. |
| 7,242,116 B2 | 7/2007 | Kawazu et al. |
| 8,887,000 B2 | 11/2014 | Teranishi et al. |
| 9,361,073 B2 | 6/2016 | Prosak et al. |
| 10,020,151 B2 | 7/2018 | Prosak et al. |
| 2006/0040792 A1 | 2/2006 | Muneta |

(Continued)

FOREIGN PATENT DOCUMENTS

EP    2385480 A1    9/2011

OTHER PUBLICATIONS

International Preliminary Report on Patentability in related International Application No. PCT/US2020/041512, dated Jun. 25, 2021, 21 pages.

(Continued)

*Primary Examiner* — Syed A Roni
(74) *Attorney, Agent, or Firm* — Craige Thompson; Thompson Patent Law; Timothy D. Snowden (57) ABSTRACT

Apparatus and associated methods relate to generating a wiring schema with more than one safety device sharing at least one test signal through one or more external terminal blocks when the number of terminals required by safety devices exceeds the number of available terminals of a safety controller. In an illustrative example, the method may include determining a total number of terminals A of safety devices to be connected to a safety evaluation device having a number of terminals B. If A is greater than B, the method may then include generating a wiring schema that one or more external terminal blocks may show indicia of electrical connections between an identified set of safety devices and a shared terminal of the safety evaluation device associated with that set. By using the method, the number of devices that can be connected to the safety evaluation device may be expanded.

20 Claims, 5 Drawing Sheets

(56) References Cited

U.S. PATENT DOCUMENTS

2006/0259837 A1 11/2006 Teranishi et al.
2015/0185710 A1 7/2015 Prosak et al.

OTHER PUBLICATIONS

International Search Report in related International Application No. PCT/US2020/041512, dated Oct. 6, 2020, 3 pages.
Written Opinion of the International Searching Authority in related International Application No. PCT/US2020/041512, dated Oct. 6, 2020, 8 pages.
Banner, XS/SC26-2 and SC10-2 Safety Controllers Instruction Manual, instruction manual, Apr. 26, 2019, 162 pages, United States.
Allen-Bradley, Guardmaster Safety Relays, Rockwell Automation Publication, Mar. 2017, [online], [retrieved on Feb. 4, 2019]. Retrieved from the Internet <https://literature.rockwellautomation.com/idc/groups/literature/documents/um/440r-um013_-en-p.pdf>.

METHODS TO GENERATE A WIRING SCHEMA

TECHNICAL FIELD

Various embodiments relate generally to generating a test signal wiring schema for connections between safety devices and a safety evaluation device.

BACKGROUND

A typical machine safeguarding system may include safety devices (e.g., light curtains, two-hand controls, safety mats, safety laser scanners) connected to a safety evaluation device to protect users from hazards identified on machines. A safety evaluation device may be used during operation of potentially dangerous machines. A safety evaluation device may receive inputs from safety devices. A safety evaluation device may have self-monitored safety outputs. Safety outputs may be used to remove power from machines in a hazardous area. A safety evaluation device may monitor for faults on both the inputs and outputs. Proper use of safety evaluation devices may increase personnel safety when operating a potentially dangerous machine.

In a machine safeguarding system, a safety evaluation device may include a safety relay. Some systems may use two safety relays, where one safety relay may be linked to one safety device (e.g., an emergency stop button), and the other safety relay may be linked to another safety device (e.g., a safety light curtain). The safety relays may be configured to halt hazardous motion, for example, in response to a beam break at the light curtain. In various machine safeguarding systems, a safety evaluation device may include a safety programmable logic controller (PLC) or a safety controller.

Some safety controllers may be configurable. For example, a first user may need a safety controller configured only to monitor and generate alerts according to a predetermined set of instructions. A second user may need the safety controller configured to monitor and respond, in accordance with another predetermined set of instructions, if a fault is detected. As such, configurable safety controllers may offer users a wide variety of configurable options that a user may configure according to the user's needs.

SUMMARY

Apparatus and associated methods relate to generating a wiring schema with more than one safety device sharing at least a test signal through one or more external terminal blocks when the number of terminals required by the safety devices exceeds the number of available terminals of a safety controller. In an illustrative example, the method may include determining the total number of terminals A of safety devices to be connected to the safety controller having a number of terminals B. If A is greater than B, the method may then include generating a wiring schema that one or more external terminal blocks may show electrical connections between an identified set of safety devices and a shared terminal of the safety evaluation device associated with that set. By using the method, the number of devices that can be connected to the safety evaluation device may be expanded.

Various embodiments may achieve one or more advantages. For example, some embodiments (e.g., applying automatic terminal optimization (ATO) feature with external terminal blocks) may generate a wiring schema that enables terminals of a safety controller to be shared by different safety devices to save terminals of the safety controller. In some embodiments, a testing circuit may be cost-effective as inventories and prices of devices may be considered during the design of wiring schema. In some embodiments, the safety evaluation device may be a combination of two safety relays and a safety controller to provide a cost-effective replacement for two safety relay modules. The safety evaluation device may be designed to have two independent safe outputs that are capable of high current and/or a wide range of voltage. Some embodiments may provide an easy-to-use, configurable, and expandable safety evaluation device designed to monitor multiple safety and non-safety input devices, providing safe stop and start functions for machines with, for example, hazardous motion. The safety evaluation device may replace multiple safety relay modules in applications that include such safety input devices as, for example, E-stop buttons, interlocking gate switches, safety light curtains, two-hand controls, and safety mats. In some embodiments, the safety evaluation devices may also be used in place of larger and more complex safety programmable logic controllers (PLCs) with the use of additional terminals and/or output expansion modules. In some embodiments, the safety evaluation device may have an intuitive programming environment to provide flexible and easy-to-use functions for dynamic field installation of safety devices to upgrade an existing machine safeguarding system.

In some embodiments, the schema could be schematic representations of efficient sharing of terminals according to predetermined test signal criteria, for example. Some embodiments may permit automatically suggesting wiring schema based on available terminal block inventory, for example, and test signal compatibility. Some embodiments may automatically adjust or tailor test signal (e.g., amplitude, phase, frequency, delay) to satisfy overlapping test signal specification ranges.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary design environment used to design a configuration for an illustrated scenario is introduced with reference to FIG. 1. Second, with reference to FIG. 2 an exemplary architecture of a wiring schema design system used to generate a wiring schema that enables safety devices to share of one or more terminals of safety controller is discussed. Then, with reference to FIG. 3, an exemplary wiring schema indicating exemplary connections between the safety devices and the safety controller are discussed. Finally, with reference to FIG. 4-5, exemplary methods to generate a wiring schema are discussed. Various embodiments may advantageously expand the number of safety devices that can be connected to the safety controller.

Figure 1:
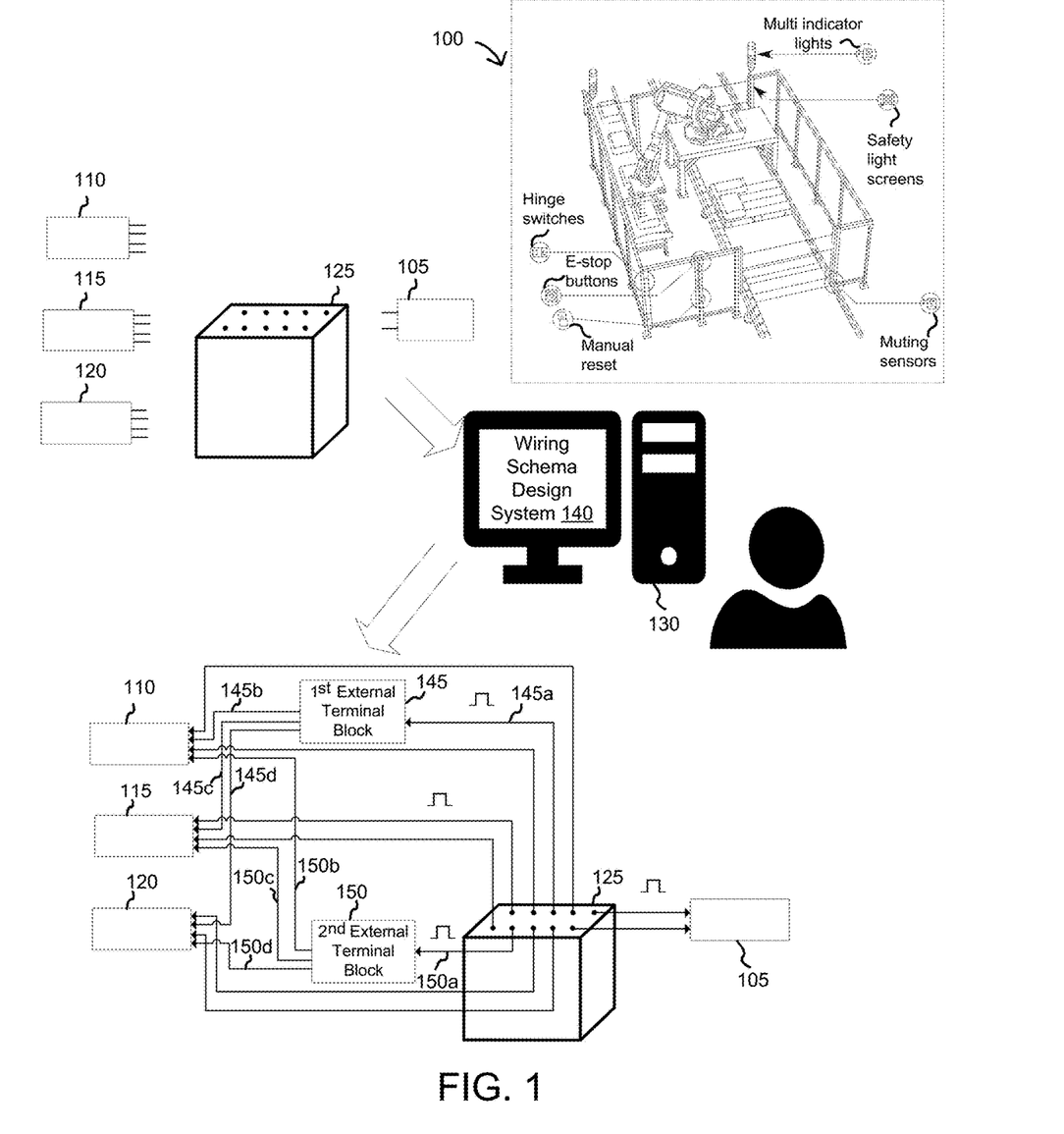
FIG. 1 depicts an exemplary wiring schema design system employed in an illustrative use-case scenario.

FIG. 1 depicts an exemplary wiring schema design system employed in an illustrative use-case scenario. In a depicted scenario 100, a robotic palletizer is safeguarded by safety devices (e.g., safety light curtains, e-stop buttons). There may be several safety functions involved with the robotic palletizer. The status of the safety devices may need to be communicated to operators. Status monitoring may allow operators to ensure everything is running smoothly and ensure no safety hazards exist. In this depicted example, a safety evaluation device 125 may be configured to provide a safeguarding solution and manage all of the safety devices 105, 110, 115, 120 with one module by executing one or more configuration profiles stored in the safety evaluation device 125. The safety evaluation device 125 may use test signals (e.g., test pulses) to detect a short that may otherwise mask a fault in the wiring or internals of a safety device (e.g., safety device 105, 110, 115, 120). A test signal may have a characteristic predetermined waveform. By way of example and not limitation, the waveform may have a specified frequency period, amplitude, transient time, and/or duty cycle. The test signal may also be a test pattern, analog signal, digital signal, or combination of signal types or waveforms. The safety evaluation device 125 may sense a pulsed output through the contacts of the safety devices by looking for the specific pulses signal at the assigned terminal on the safety evaluation device 125. When dual channel safety devices are used, the test signals may be different for channel 1 and channel 2 allowing the safety evaluation device to detect a short between the channels.

Test signals may be shared among different safety devices (e.g., safety device 110, 115, 120) to advantageously save terminals for the safety evaluation device 125. In this depicted example, the safeguarding solution information is sent to a server 130. The server 130 may include a wiring schema design system 140 that may be used to generate a wiring schema with more than one safety device sharing at least one test signal through one or more external terminal blocks (ETBs) (e.g., a first ETB 145, a second ETB 150) when the number of terminals required by safety devices exceeds the number of available terminals of a safety evaluation device, which may advantageously expand the number of safety devices to be connected and tested.

In this illustrated example, the safety evaluation device 125 includes 10 input terminals. 4 input terminals of the 10 input terminals may be convertible as non-safe output terminals and may be used to output test pulses to detect safety device 105, 110, 115, 120 which have 14 terminals. The 4 non-safe output terminals may be shared. The remaining 6 input terminals of the safety evaluation device 125 may be used as input terminals and not convertible and not sharable. In some embodiments, the safety evaluation device 125 may include, for example, 26 input terminals and 8 input terminals may be convertible.

A first terminal of the safety evaluation device 125 may output a first test pulse 145a. The first external terminal block 145, having one input and three outputs, receives the first test pulse 145a to output three output test pulses 145b, 145c, and 145d. Each of the three output test pulses 145b, 145c, and 145d may be, respectively, received by a corresponding terminal of the safety device 110, 115, 120. A second terminal of the safety evaluation device 125 may output a second test pulse 150a. The second external terminal block 150, having one input and three outputs, receives the second test pulse 150a to generate three output test pulses 150b, 150c, 150d. Each of the three output test pulses 150b, 150c, 150d may be, respectively, received by a corresponding terminal of the safety device 110, 115, 120. By sharing the first test pulse 145a and the second test pulse 150a, the number of devices that can be connected to the safety evaluation device may be expanded. An exemplary wiring schema design system with a test signal sharing feature is described in further detail with reference to FIG. 2 and an exemplary wiring schema is described with reference to FIG. 3.

In some embodiments, the safety evaluation device 125 may have a number of input terminals that can be used to monitor either safety or non-safety devices. The safety or non-safety devices may incorporate either solid-state or contact-based outputs, for example. Some of the input terminals may be configured to either source 24V DC for monitoring contacts or to signal the status of an input or an output, for example. The function of each input circuit may depend on the type of the device connected. The function may be established during configuration. In some embodiments, the input terminals may be screw-type terminals. In various embodiments, the input terminals may be spring-cage terminals, tension spring terminals, for example, or, may be mechanically connected by clips, screws, solder joints, splicing, or the like suitable to make, for example, galvanic connection.

Figure 2:
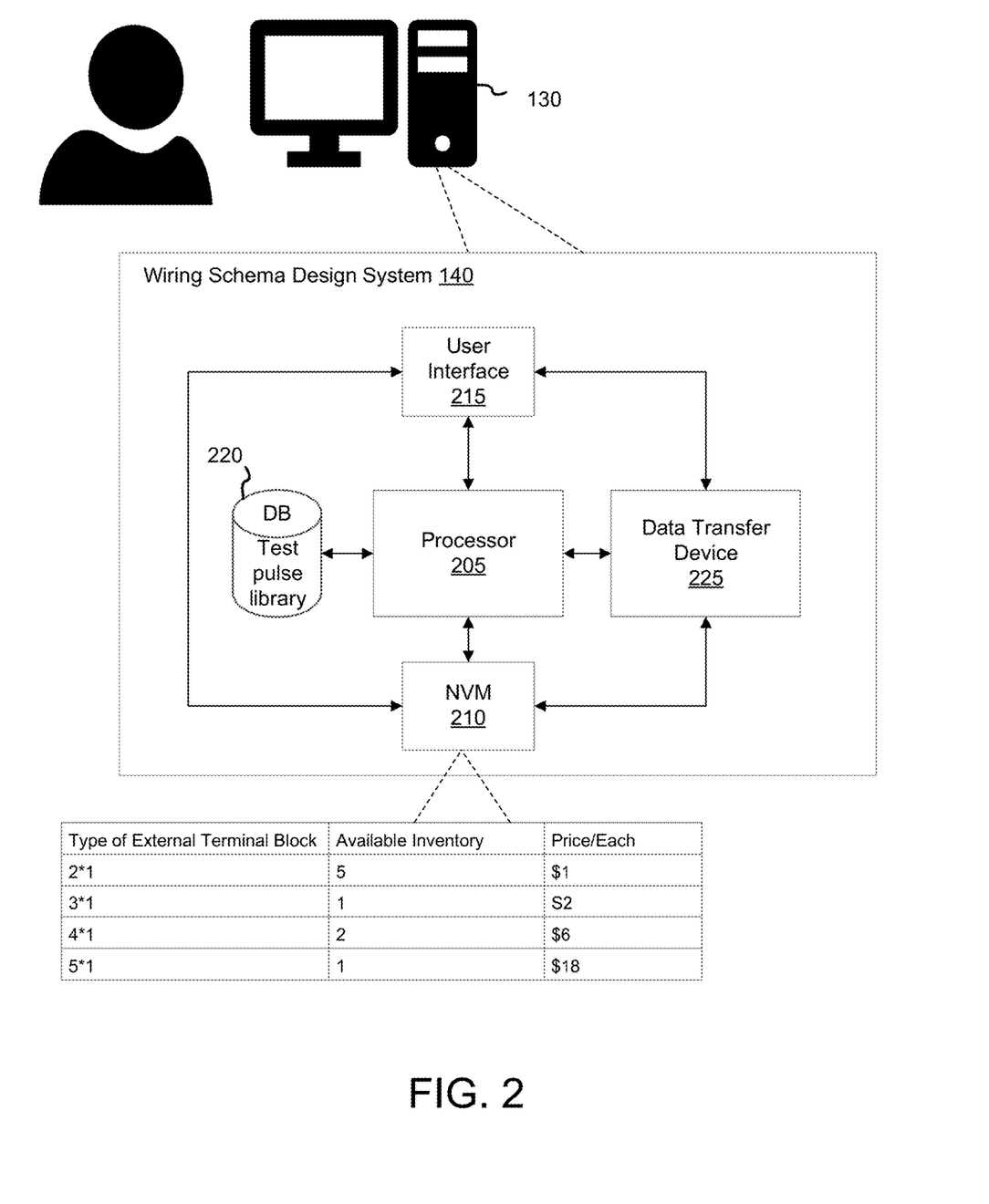
FIG. 2 depicts a block diagram of an exemplary architecture of the wiring schema design system.

FIG. 2 depicts a block diagram of an exemplary architecture of a wiring schema design system. The wiring schema design system (e.g., the wiring schema design system 140) is configured to generate a wiring schema with more than one safety device (e.g., safety devices 110, 115, 120) sharing at least one test signal through one or more external terminal blocks (e.g., ETB 145, 150) when the number (e.g., 14 terminals) of terminals required by safety devices exceeds the number of available terminals (e.g., 10 terminals) of a safety evaluation device 125, for example. In some embodiments, the safety evaluation device 125 may be a safety controller. In some embodiments, the safety evaluation device 125 may be a combination of two safety relays and a safety controller.

In this depicted example, the wiring schema design system 140 includes a processor 205 configured to perform predetermined operations. For example, the processor 205 may retrieve and/or write data from/to non-volatile memory (NVM) 210. The NVM 210 may also include look-up tables (LUT) to store one or more parameters/operations associated with one or more predetermined criteria. The predetermined criteria may include criteria corresponding to environmental parameters and monitored equipment status parameters, for example. In some embodiments, the LUT may include inventory information about devices (e.g., safety devices, safety evaluation devices, and/or external terminal blocks) to be used in the wiring schema.

In some embodiments, the NVM 210 may store instructions, when executed by the processor 205, that may cause the processor 205 to perform operations to generate a wiring schema. In some embodiments, a user may select the numbers and types of different safety devices from the NVM 210 to be tested by a safety evaluation device through the user interface 215. The operations may include determining a corresponding number of terminals $A_i$ for each safety device of N safety devices to be connected to the safety evaluation device and detecting a number of terminals B of the safety evaluation device available to connect to the N safety devices. A is the total terminals number of all the N safety devices.

$$A = \sum_{i=1}^{N}(A_i)$$

When A is greater than B, the processor 205 may identify one or more sets of the N safety devices that are able to share a terminal (e.g., a convertible input terminal) of the safety evaluation device based upon test signal compatibility among the N safety devices. For each of the identified one or more sets of the N safety devices, the processor 205 may assign a shared terminal of the safety evaluation device connectable to an external terminal block and generate a wiring schema. For each of the identified one or more sets, the external terminal block may provide electrical connection between each of the safety devices in that set and the shared terminal of the safety evaluation device associated with that set. By performing different operations, test signals may be shared among different safety devices and terminals may be saved.

The user interface 215 may be used to display different wiring schema options, and the user may select one wiring schema based on the inventory and/or the price of devices, for example, used in the wiring schema. The user may also enable or disable the test signal sharing feature through the user interface 215.

The generated wiring schema options may be stored in a database 220. The database 220 may also contain different test signal specifications for every possible safety device. The processor 205 may retrieve different test signals and/or wiring schemas from the database when needed. In this depicted example, the processor 205 also couples to a data transfer device 225. The data transfer device 225 may be a flash drive that can be used to store the selected wiring schema, for example.

Figure 3:
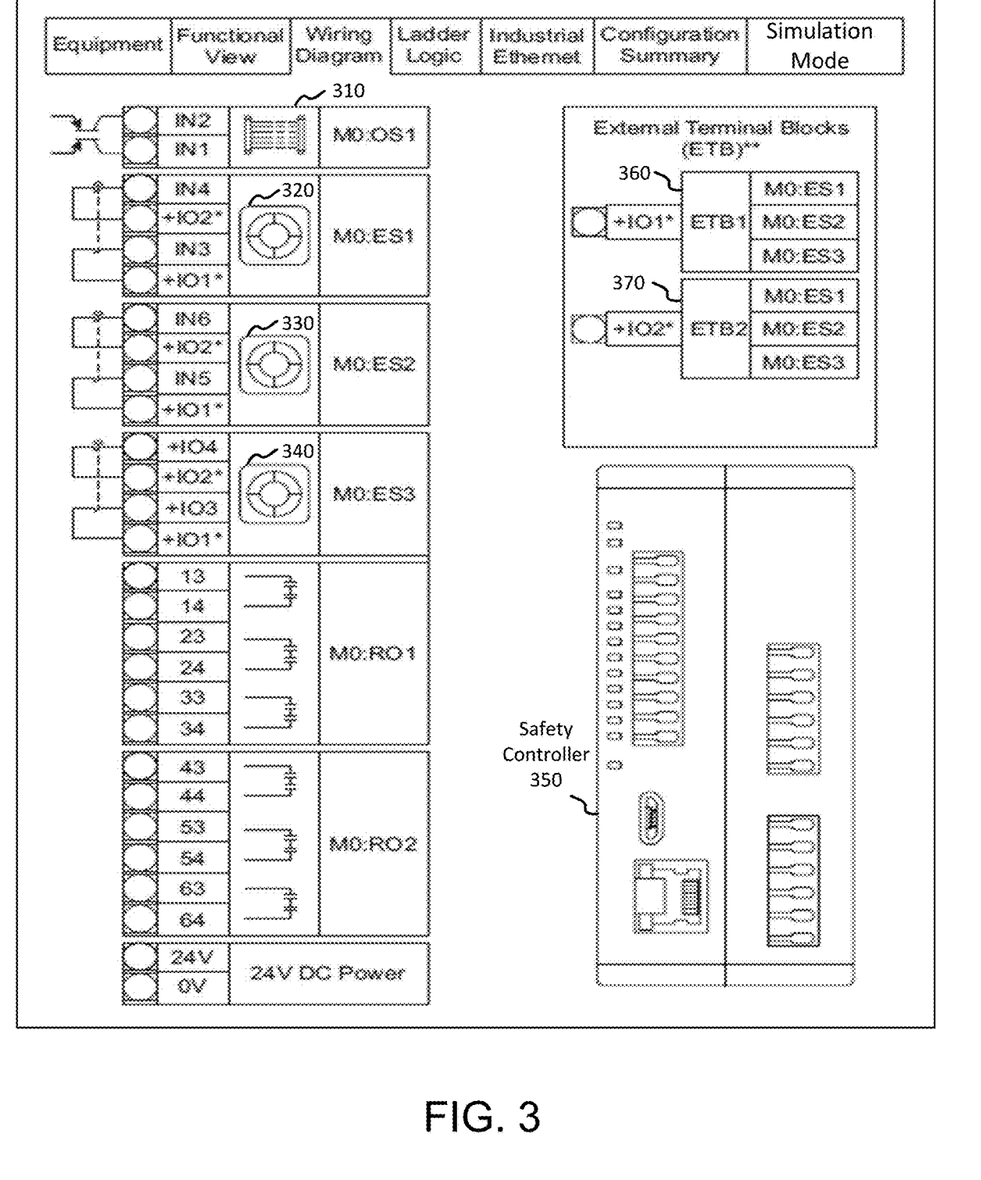
FIG. 3 depicts an exemplary wiring schema generated by the wiring schema design system.

FIG. 3 depicts an exemplary wiring schema generated by the wiring schema design system. In this depicted example, the user selects a light curtain 310, and three e-stops 320, 330, 340 to be tested by a 10-terminal safety controller 350. The light curtain 310 having two inputs may need to use two terminals of the safety controller 350, and the three e-stops 320, 330, 340 may need totally six test pulse terminals of the safety controller 350. By sharing the test pulse terminals, only two input terminals of the safety controller 350 may be used and four input terminals of the safety controller 350 may be saved. Accordingly, the wiring schema design system 140 may generate a wiring schema that enables the 14 terminals of the four safety devices 310, 320, 330, 340 to be connected to the 10-terminal safety controller 350.

In this depicted wiring diagram, a first input of the three e-stops 320, 330, 340 share a first test signal IO1* through a first external terminal block 360 and a second input of the three e-stops shares a second test signal IO2* through a second external terminal block 370. Each of the first external terminal block 360 and the second external terminal block 370 have one input connected to the first test signal IO1* or the second test signal IO2* and has three outputs connected to the three e-stops 320, 330, 340. By sharing terminals among the three e-stops 320, 330, 340, the safety controller 350 may connect with the four safety devices that totally have 14 terminals, for example. In some embodiments, the wiring schema may be a netlist, a node list or a wiring plan.

A designer may connect with wiring among the safety controller, the safety devices, and the ETBs based on the generated wiring schema.

Figure 4:
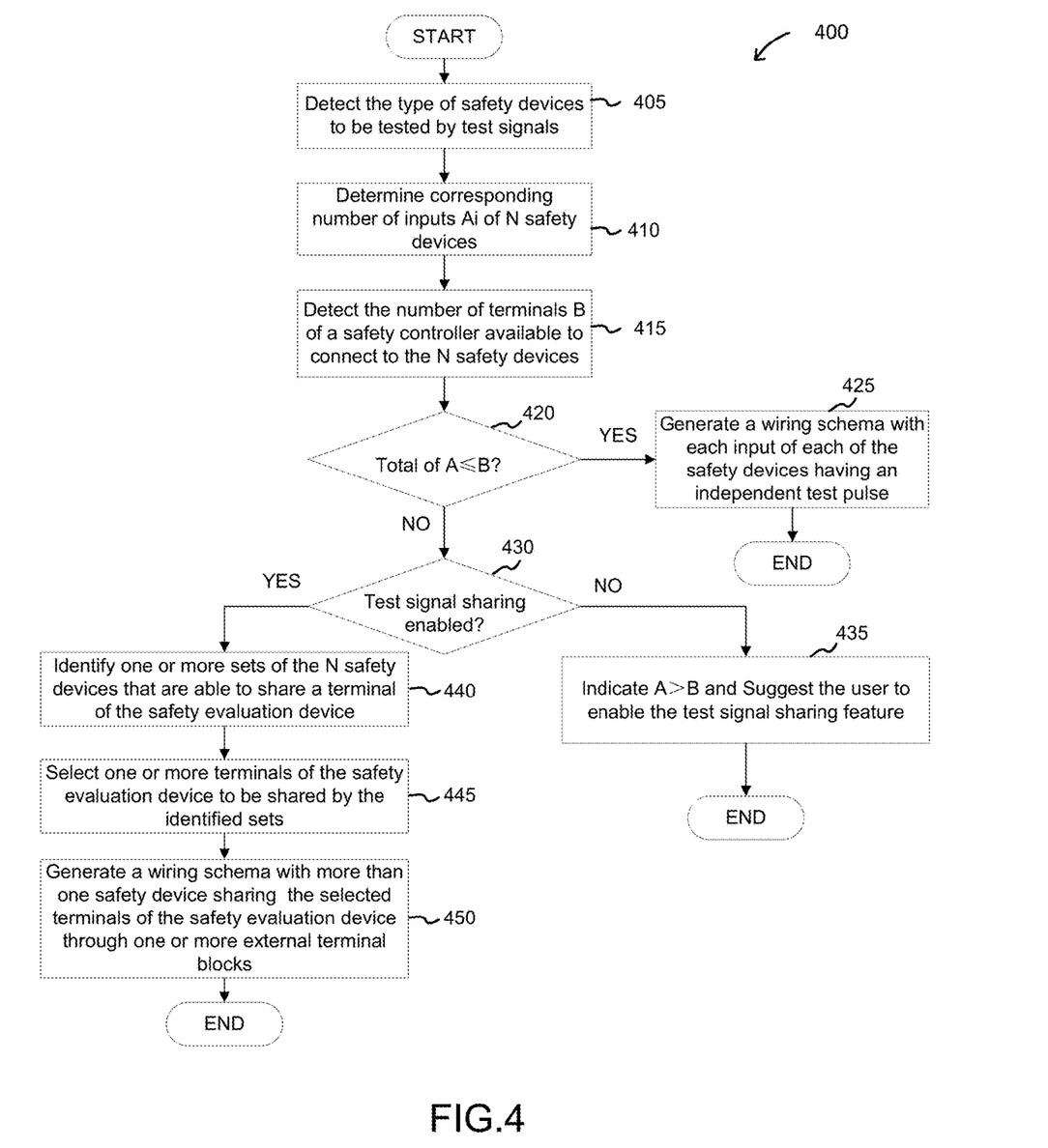
FIG. 4 depicts a flowchart to illustrate an exemplary method to generate the wiring schema.

FIG. 4 depicts a flowchart to illustrate an exemplary method to generate the wiring schema. A method 400 includes, at 405, detecting the types of N safety devices to be tested by test signals. At 410, a processor (e.g., 205) determines the corresponding number of terminals for each of the N selected safety devices. $A_i$ is the number of terminals for the $i^{th}$ safety device. In some embodiments, the processor may instruct one or more sensors to identify the corresponding number of terminals $A_i$ for N safety devices. At 415, the processor 205 detects the number B of terminals of a safety evaluation device (e.g., a safety controller) that are available to connect to the N safety devices. At 420, the processor 205 determines whether the total number A of terminals across all of the N safety devices is less than or equal to B.

$$A = \sum_{i=1}^{N}(A_i)$$

If A is less than or equal to B, then, at 425, the processor 205 generates a wiring diagram with each input of each of the N safety devices having an independent test signal. If A is not less than or equal to B, then, at 430, the processor 205 determines whether a test signal sharing feature (e.g., Automatic Terminal Optimization feature) of a wiring schema design system is enabled. If the test signal sharing feature is not enabled, then, at 435, the processor 205 doesn't generate a wiring schema. In some embodiments, the processor 205 may instruct a graphical user interface, for example, to indicate the designer that the safety evaluation device doesn't have enough available terminals.

If the test signal sharing feature is enabled, then, at 440, the processor 205 identifies which safety devices of the N safety devices can share a test signal. A set of safety devices may share one or more test signals. For example, when one light curtain and three e-stops to be tested by a 10-terminal safety controller, the processor may identify that the three e-stops can share two test signals. The three e-stops may be one set, for example. In some embodiments, the processor may also identify a first e-stop and the light curtain sharing a first test signal and a second e-stop and a third e-stop sharing a second test signal. The first e-stop and the light curtain may be one set, and the second e-stop and the third e-stop may be another set, for example.

At 445, the processor 205 selects one or more terminals of the safety evaluation device to be shared by the identified one or more sets. For example, the processor 205 may select a second terminal of the safety controller to be connected to the set that includes three e-stops via a 1-input 3-output external terminal block. At 450, the processor 205 performs predetermined operations to generate a wiring schema with more than one identified set sharing the selected terminals of the safety evaluation device through one or more external terminal blocks.

Figure 5:
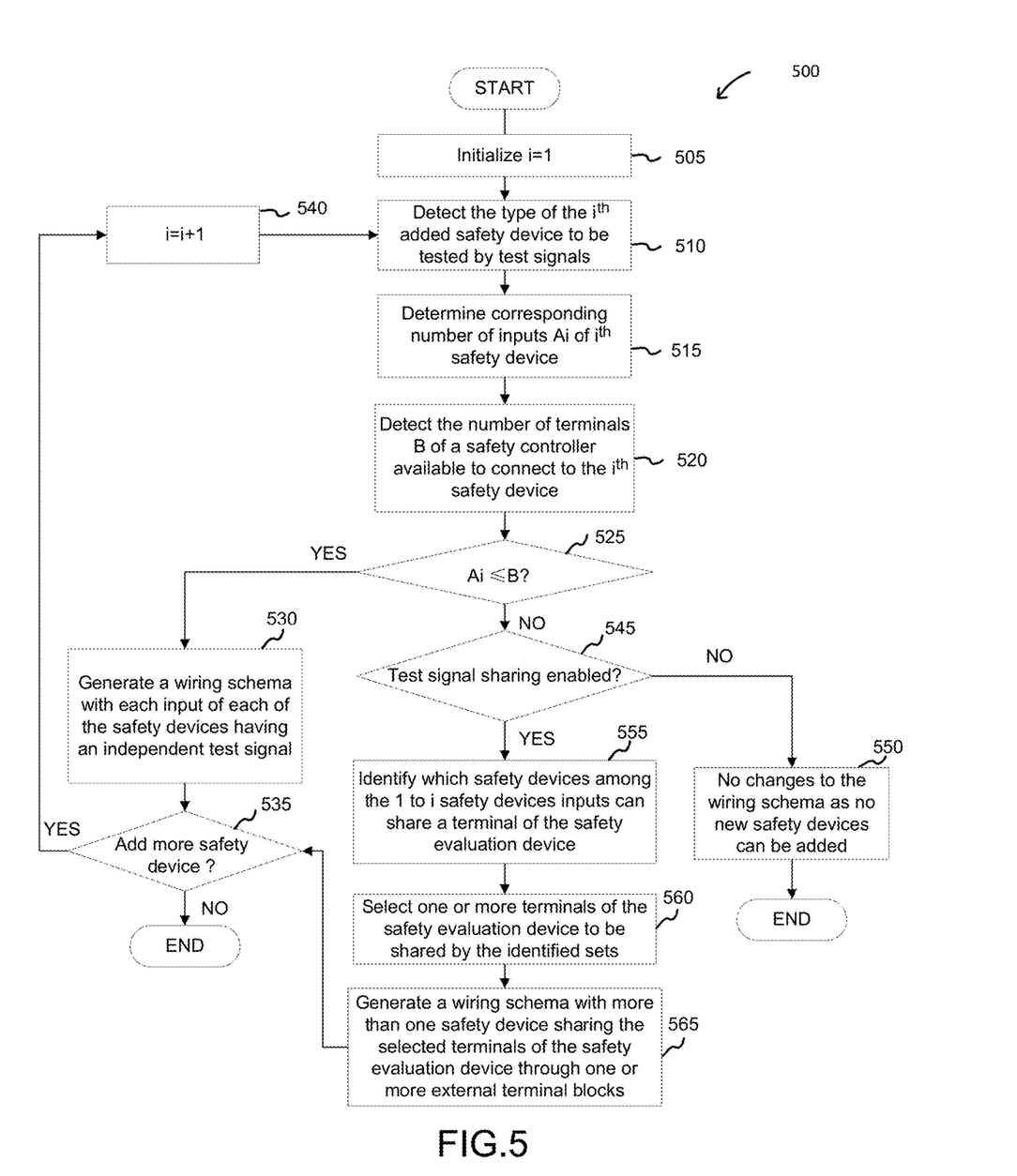
FIG. 5 depicts a flowchart to illustrate another exemplary method to generate the wiring schema.

FIG. 5 depicts a flowchart to illustrate another exemplary method to generate the wiring schema. A method 500 may be used to dynamically update a wiring schema when a new safety device is added. At 505, a processor (e.g., the processor 205) introduces a variable i and initializes i=1. At 510, the processor 205 detects the type of the $i^{th}$ safety device to be tested by test signals. At 515, the processor 205 determines the corresponding number of terminals $A_i$ for the $i^{th}$ safety device. In some embodiments, the processor 205 may instruct sensors to detect the number of terminals of the safety device. At 520, the processor 205 determines the available number of terminals $B_{avl}$ for the safety evaluation device to be connected with newly added safety devices. $B_{avl}$ equals the total available number of terminals B minus the number of terminals that are connected with safety devices.

$$B_{avl} = B - \sum_{i=1}^{N} (A_i)$$

For example, a safety controller may have 10 available terminals (e.g., B=10) that can be used to connect with safety devices. When an e-stop (e.g., $A_1$=4) is connected to the safety controller, the safety controller may have 6 available terminals (e.g., $B_{avl}$=B−$A_1$=6).

At 525, the processor 205 determines whether the corresponding number of terminals $A_i$ for the $i^{th}$ safety device is less than or equal to the available terminals number $B_{avl}$ of the safety controller. If $A_i$ is less than or equal to $B_{avl}$ (which means the safety controller has enough available terminals that each input of the $i^{th}$ safety device can have an independent test signal), then, at 530, the processor 205 performs predetermined operations to generate a wiring schema with each input of the $i^{th}$ safety devices having an independent test signal. At 535, the processor 205 decides whether to add more safety devices to the generated wiring schema. If more safety devices are added, at 540, the processor 205 increments the variable i and loops back to 510. If no more safety devices are needed, the method ends.

If $A_i$ is not less than or equal to $B_{avl}$ (which means the safety controller doesn't have enough available terminals that each input of the $i^{th}$ safety device can have an independent test signal), then, at 545, the processor 205 checks whether a test signal sharing feature (e.g., Automatic Terminal Optimization feature) is enabled or not. If the designer doesn't enable the test signal sharing feature, then at 550, the processor 205 keeps the previous wiring schema after added the $(i-1)^{th}$ safety device as no new safety devices can be added.

If the designer enables the test signal sharing feature, then at 555, the processor identifies which safety devices of among the i safety devices can share a test signal with the $(i+1)^{th}$ safety device. Safety devices that may share one or more test signals are called a set. For example, when one light curtain, a first e-stop, and a second e-stop have already been connected to a 10-terminal safety controller, the available terminal number B of the safety controller may be 0. When a third e-stop is added, and test signal feature is enabled, the processor 205 may identify which safety devices of the light curtain, the first and the second e-stops can share terminals with the third e-stop. For example, the processor may identify the three e-stops share test signals. In some embodiments, the processor may identify the first e-stop and the light curtain sharing a first test signal and the second e-stop and the third e-stop sharing a second test signal.

At 560, the processor 205 selects one or more terminals of the safety controller to be shared by the identified one or more sets. For example, the processor 205 may select a second terminal of the safety controller to be connected to the set that includes three e-stops via a 1-input 3-output external terminal block. At 565, the processor 205 performs predetermined operations to generate a wiring schema with more than one identified set sharing the selected terminals of the safety evaluation device through one or more external terminal blocks. After the wiring schema is generated, the processor 205 loops back the method to 535. If more safety devices are added, the processor 205 increments the variable i and loops back to 510. If no more safety devices need to be added, the method ends.

In some embodiments, the safety controller may be used to adjust test signals to fit within overlapped specifications. For example, if input A may be tested between 1V and 8V, input B may be tested between 4V and 6V, the safety controller may adjust the test signal to 5V to be suitable for both input A and input B.

Although various embodiments have been described with reference to the figures, other embodiments are possible. For example, some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them. Although in the depicted example, external terminal blocks are used, in some other implementations, external terminal blocks may be replaced by any suitable conductive node to which multiple test signal wire may be connected.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some embodiments, the indicia of electrical connections may include one or more symbols representing physical electrical connections or wiring connections between one or more external terminal blocks and one or more terminals of a safety evaluation device, for example. The indicia of electrical connections may include symbols representing physical electrical connections or wiring connections between one or more external terminal blocks and one or more terminals of one or more safety devices. The indicia of electrical connections may also include symbols representing physical electrical connections or wiring connections between one or more terminals of one or more safety devices and one or more terminals of a safety evaluation device, for example.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In one exemplary aspect, a method to generate a wiring schema, the method includes determining a corresponding number of terminals $A_i$ for each safety device of N safety devices to be connected to a safety evaluation device. The method also includes detecting a number of terminals B of the safety evaluation device available to connect to the N safety devices. $A=\Sigma A_i$, i is from 1 to N. If A is greater than B, the method also includes (a) identifying one or more sets of the N safety devices that are able to share a terminal of the safety evaluation device based upon test signal compatibility among the N safety devices, (b) for each of the identified one or more sets of the N safety devices, determining a shared terminal of the safety evaluation device connectable to an external terminal block, and (c) generating a wiring schema. For each of the identified one or more sets, the external terminal block provides electrical connection between each of the safety devices in that set and the shared terminal of the safety evaluation device associated with that set.

In some embodiments, if A is less than or equal to B, the method may also include generating a wiring schema with each input of each of the N safety devices having an independent terminal of the safety evaluation device. The wiring schema may include indicia of electrical connections between the one or more external terminal blocks and the N safety devices. The wiring schema may include a wiring diagram or a netlist.

In some embodiments, the method may also include enabling a sharing feature before operation (a). In some embodiments, the method may also include detecting types of safety devices to be connected with the safety evaluation device. In some embodiments, the safety evaluation device may include a safety controller and two safety relays. The safety evaluation device may include a spring clamp terminal block. The safety devices may include a light curtain.

In another exemplary aspect, a system includes a processor operatively configured to (1) receive a first information of a total number of terminals A of N safety devices to be connected to a safety evaluation device, (2) receive a second information of a number of terminals B of the safety evaluation device available to connect to the N safety devices, and (3) determine whether A is greater than B. The system includes a data storage device, coupled to the processor, configured to store operations to be performed by the processor to connect the N safety devices with the safety evaluation device, if A is greater than B, the operations includes: (a) identifying one or more sets of the N safety devices that are able to share an input of the safety evaluation device based upon test signal compatibility among the N safety devices, (b) for each of the identified one or more sets of the N safety devices, determining a shared terminal of the safety evaluation device connectable to an external terminal block, and, (c) generating a wiring schema, wherein, for each of the identified one or more sets, the external terminal block provides electrical connection between each of the safety devices in that set and the shared terminal of the safety evaluation device associated with that set.

In some embodiments, if A is less than or equal to B, the operations may also include generating a wiring schema with each input of each of the N safety devices having an independent terminal of the safety evaluation device. In some embodiments, the operations may also include enabling a sharing feature before operation (a). In some embodiments, the operations may also include detecting types of safety devices to be connected with the safety evaluation device. In some embodiments, the safety evaluation device may include a safety controller and two safety relays. In some embodiments, the safety evaluation device may include a spring clamp terminal block. In some embodiments, the wiring schema may include a wiring diagram. In some embodiments, the wiring schema may include a netlist. In some embodiments, wherein the wiring schema may include indicia of electrical connections between the one or more external terminal blocks and the N safety devices. In some embodiments, wherein the first information and the second information may be inputted by a user via a graphical user interface.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A method to generate a wiring schema, the method comprising:
   determining a corresponding number of terminals Ai for each safety device of N safety devices to be connected to a safety evaluation device; and,
   detecting a number of terminals B of the safety evaluation device available to connect to the N safety devices, wherein, $A=\Sigma_{i=1}^{N}(A_i)$, and
   upon determining A is greater than B, then:
      identifying one or more sets of the N safety devices that are able to share a terminal of the safety evaluation device based upon test signal compatibility among the N safety devices;
      for each of the identified one or more sets of the N safety devices, determining a shared terminal of the safety evaluation device connectable to an external terminal block; and,
      generating a wiring schema, wherein, for each of the identified one or more sets, the external terminal block provides electrical connection between each of the safety devices in that set and the shared terminal of the safety evaluation device associated with that set.

2. The method of claim 1, further comprising: upon determining A is less than or equal to B, generating a wiring schema with each input of each of the N safety devices connecting to an independent terminal of the safety evaluation device.

3. The method of claim 1, wherein the wiring schema comprises, for each of the identified one or more sets, indicia of electrical connections between the external terminal block and the N safety devices.

4. The method of claim 1, wherein the wiring schema comprises a wiring diagram.

5. The method of claim 1, wherein the wiring schema comprises a netlist.

6. The method of claim 1, further comprising: enabling a sharing feature before operation (a).

7. The method of claim 1, further comprising: detecting types of safety devices to be connected with the safety evaluation device.

8. The method of claim 1, wherein the safety evaluation device comprises a safety controller and two safety relays.

9. The method of claim 1, wherein the safety evaluation device comprises a spring clamp terminal block.

10. The method of claim 1, wherein the number of terminals $A_i$, and the number of terminals B are inputted by a user via a graphical user interface.

11. A system comprising:
   a processor operatively configured to:
      receive a first data of a total number of terminals A of N safety devices to be connected to a safety evaluation device;
      receive a second data of a number of terminals B of the safety evaluation device available to connect to the N safety devices;
      determine whether A is greater than B;
   a data storage device coupled to the processor to store operations to be performed by the processor to connect the N safety devices with the safety evaluation device, wherein the operations comprise:
      upon determining A is greater than B, then:
      identifying one or more sets of the N safety devices that are able to share a terminal of the safety evaluation device based upon test signal compatibility among the N safety devices;
      for each of the identified one or more sets of the N safety devices, determining a shared terminal of the safety evaluation device connectable to an external terminal block; and,
      generating a wiring schema, wherein, for each of the identified one or more sets, the external terminal block provides electrical connection between each of the safety devices in that set and the shared terminal of the safety evaluation device associated with that set.

12. The system of claim 11, wherein the operations further comprise: upon determining A is less than or equal to B, generating a wiring schema with each terminal of each of the N safety devices connecting to an independent input of the safety evaluation device.

13. The system of claim 11, wherein the operations further comprise: enabling a sharing feature before operation (a).

14. The system of claim 11, wherein the operations further comprise: detecting types of safety devices to be connected with the safety evaluation device.

15. The system of claim 11, wherein the safety evaluation device comprises a safety controller and two safety relays.

16. The system of claim 11, wherein the safety evaluation device comprises a spring clamp terminal block.

17. The system of claim 11, wherein the wiring schema comprises a wiring diagram.

18. The system of claim 11, wherein the wiring schema comprises a netlist.

19. The system of claim 11, wherein the wiring schema comprises indicia of electrical connections between the one or more external terminal blocks and the N safety devices.

20. The system of claim 11, wherein the first data and the second data are inputted by a user via a graphical user interface.

\* \* \* \* \*